US011368261B2

(12) United States Patent
Cerovic et al.

(10) Patent No.: US 11,368,261 B2
(45) Date of Patent: Jun. 21, 2022

(54) OMAMRC TRANSMISSION METHOD AND SYSTEM WITH SLOW LINK ADAPTATION UNDER BLER CONSTRAINT

(71) Applicant: ORANGE, Issy-les-Moulineaux (FR)

(72) Inventors: Stefan Cerovic, Chatillon (FR); Raphaël Visoz, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/970,154

(22) PCT Filed: Feb. 11, 2019

(86) PCT No.: PCT/FR2019/050294
§ 371 (c)(1),
(2) Date: Aug. 14, 2020

(87) PCT Pub. No.: WO2019/162592
PCT Pub. Date: Aug. 29, 2019

(65) Prior Publication Data
US 2021/0067284 A1   Mar. 4, 2021

(30) Foreign Application Priority Data
Feb. 23, 2018   (FR) ........................................ 1851593

(51) Int. Cl.
*H04L 5/00* (2006.01)
*H04B 7/155* (2006.01)
(Continued)

(52) U.S. Cl.
CPC ........... *H04L 5/0007* (2013.01); *H04B 7/155* (2013.01); *H04L 1/0003* (2013.01); *H04L 1/0009* (2013.01); *H04L 1/203* (2013.01)

(58) Field of Classification Search
CPC ... H04L 5/0007; H04L 1/0003; H04L 1/0009; H04L 1/203; H04B 7/155
See application file for complete search history.

(56) References Cited

U.S. PATENT DOCUMENTS

| 11,128,403 B2 * | 9/2021 | Lin ...................... H04L 5/0053 |
| 2012/0106433 A1 * | 5/2012 | Seo ........................ H04B 7/155 |
| | | 370/315 |

(Continued)

FOREIGN PATENT DOCUMENTS

| WO | 2017091177 A1 | 6/2017 |
| WO | 2017098188 A1 | 6/2017 |

OTHER PUBLICATIONS

International Search Report dated Jun. 18, 2019 for corresponding International Application No. PCT/FR2019/050294, filed Feb. 11, 2019.

(Continued)

*Primary Examiner* — Janice N Tieu
(74) *Attorney, Agent, or Firm* — David D. Brush; Westman, Champlin & Koehler, P.A.

(57) ABSTRACT

A method for transmitting consecutive messages forming a frame for a telecommunication system. The system has M sources, optionally L relays, and a destination, M≥2, L≥0. An orthogonal multiple-access multiple-relay channel scheme is used between the M sources and the L relays with a maximum number of M+T max time intervals per transmitted frame, including M intervals allocated during a first phase to the consecutive transmission of the M sources and T used intervals for at least one cooperative transmission allocated during a second phase to at least one node selected according to a selection strategy. T used≤Tmax. The link adaptation implemented by the destination is slow and maximizes average utility metrics under constraint of an average individual BLER for each source. The utility metrics include average spectral efficiency tied to the strategy for selecting the nodes intervening during the second phase.

7 Claims, 1 Drawing Sheet

(51) Int. Cl.
    *H04L 1/00*        (2006.01)
    *H04L 1/20*        (2006.01)

(56) References Cited

U.S. PATENT DOCUMENTS

| | | | |
|---|---|---|---|
| 2016/0352454 A1* | 12/2016 | Zhang | H04L 5/006 |
| 2018/0367254 A1* | 12/2018 | Mohamad | H04L 1/0076 |
| 2020/0053770 A1* | 2/2020 | Gulati | H04L 1/0025 |

OTHER PUBLICATIONS

Written Opinion of the International Searching Authority dated Jun. 18, 2019 for corresponding International Application No. PCT/FR2019/050294, filed Feb. 11, 2019.

English translation of the Written Opinion of the International Searching Authority dated Aug. 27, 2020 for corresponding International Application No. PCT/FR2019/050294, filed Feb. 11, 2019.

IB/338 PCT Form dated Sep. 3, 2020 for corresponding International Application No. PCT FR2019/050294, filed Feb. 11, 2019.

Mohamad Abdulaziz et al. "Cooperative Incremental Redundancy Hybrid Automatic Repeat Request Strategies for Multi-Source Multi-Relay Wireless Networks" IEEE Communications Letters, IEEE Service Center, Piscataway, NJ, US, vol. 20, No. 9, Sep. 1, 2016 (Sep. 1, 2016), pp. 1808-1811.

\* cited by examiner

OMAMRC TRANSMISSION METHOD AND SYSTEM WITH SLOW LINK ADAPTATION UNDER BLER CONSTRAINT

CROSS-REFERENCE TO RELATED APPLICATIONS

This Application is a Section 371 National Stage Application of International Application No. PCT/FR2019050295, filed Feb. 11, 2019, the content of which is incorporated herein by reference in its entirety, and published as WO 2019162592 on Aug. 29, 2019, not in English.

FIELD OF THE DISCLOSURE

The present invention relates to the field of digital communications. Within this field, the invention relates more particularly to the transmission of coded data between at least two sources and a destination with relaying by at least two nodes, which may be relays or sources.

It is understood that a relay does not have a message to transmit. A relay is a node dedicated to relaying messages from sources, whereas a source has its own message to transmit and may also in some cases relay messages from other sources.

There are numerous relay techniques known by their English name: "amplify and forward", "decode and forward", "compress-and-forward", "non-orthogonal amplify and forward", "dynamic decode and forward", etc.

The invention applies in particular, but not exclusively, to the transmission of data via mobile networks, for example for real-time applications, or via for example sensor networks.

Such a sensor network is a multi-user network, consisting of a plurality of sources, a plurality of relays and a recipient using an orthogonal multiple access scheme of the transmission channel between the relays and the destination, denoted OMAMRC ("*Orthogonal Multiple-Access Multiple-Relay Channel*").

BACKGROUND OF THE DISCLOSURE

An OMAMRC network implementing what is called an IR-HARQ (Incremental Redundancy Hybrid-ARQ) cooperation strategy based on selective relaying known as SDF (Selective Decode and Forward) is known from [1].

In this type of cooperation, the mutually independent sources, in a first phase, broadcast their coded information sequences in the form of messages for the attention of a single recipient and in the presence of relays. Relay nodes may be either sources or relays. The relays under consideration, of "Half Duplex" HD type (that is to say a relay is not able to receive and transmit simultaneously), receive messages from the sources, decode them and generate a message solely from messages from the sources that are decoded without an error. The relays, in a second phase, access the channel orthogonally in time with one another in order to transmit their message to the destination. The selectivity of the relays means that a relay transmits a message only if it decodes at least one source without an error. During the second phase, a source may behave like a relay that has decoded at least one of the messages from the sources without an error, the message from the source under consideration. Thus, during the second phase, all of the nodes of the system are considered to be relay nodes that are able to access the channel orthogonally in time. During the second phase, the destination may choose which node should transmit at a given time. It is also possible for the relay nodes to follow an activation sequence known in advance by the destination and by the relay nodes during the second phase.

Very low-rate control channels are authorized from the destination to the sources to allocate the rates to the sources. In addition, the sources and the relays have to periodically feed back, to the destination, metrics representative of the average SNR of the links that they are able to observe.

In addition, low-rate control channels are necessary to implement the transmission node selection strategy.

The retransmission from a node (which may be a relay or a source) contains one or more combined messages from the sources. This is requested by a control signal broadcast by the destination or follows an activation sequence known in advance and results in the transmission of redundancy by the selected node based on incremental coding of one or more sources. There may also be control channels so that each node informs the destination of the received and correctly decoded messages.

Such a method is particularly suitable for a system deployed in an urban environment in which the transmission channel generally has what is called a Rayleigh fading profile. Specifically, such fading impacts the transmitted signal and results in a non-zero probability of erroneous detection (what is called outage probability).

Among the transmission techniques involving relaying, a slow link adaptation method for an OMAMRC system is known. Before any transmission, the destination implements a slow link adaptation, that is to say it allocates rates to the sources, knowing the statistical distribution of all of the channels (CDI: Channel Distribution Information). In general, it is possible to deduce the CDI on the basis of knowing the average SNR of each link in the system.

The rates determined during implementation adopt discrete values. Each rate $R_s$ allocated to the source s corresponds to a coding and modulation scheme (MCS: Modulation and Coding Scheme) that belongs to the family of MCSs defined by the system. Hereinafter, the sum $\Sigma_i R_{s_i}$ of these rates is called sum rate and should not be confused with average spectral efficiency.

Source message transmissions are divided into frames during which the CSIs of the links are assumed to be constant (slow fading scenario). The rate allocation is assumed not to change for several hundred frames, and it changes only with changes in CDI.

The transmission of a frame takes place in two phases that are possibly preceded by an additional phase.

During the first phase, the sources each transmit their respective message in turn during time slots each dedicated to a source.

A hybrid and automatic repeat request (HARQ) with incremental redundancy (IR) is used during the second phase as an effective a posteriori mechanism for fast link adaptation, in which the source coding rates adapt to the known quality of the channel. During each time slot of the second phase, the destination schedules the transmitting node. The transmitting node implements joint channel and network coding (JNCC: Joint Network Channel Coding) on the messages that it has successfully decoded.

The slow link adaptation method is implemented during the initial phase that takes place before the first phase, specifically once every several hundred frames (that is to say each time the quality statistics of the channel/link change).

Slow link adaptation proposes to find the maximum sum rate under the constraint of achieving an average common target BLER based on the outage probability $\varepsilon_{com}$ after a fixed number $X \geq 1$ of cooperative retransmissions. The method is thus based on the idea that, with an appropriate choice of the average common target BLER, which is correlated with the average individual BLERs, it is possible to achieve good spectral efficiency.

An algorithm based on an interference-free or "Genie Aided" approach is used to solve the multidimensional rate allocation optimization problem. This approach consists in independently determining each rate of a source, assuming that all of the messages from other sources are known to the destination and the relays.

Although the cooperation strategy is such that the sources and the relays cooperate so as to maximize the sum of the rates transmitted between the sources and the destination in a situation close to reality, that is to say where there is no symmetry imposed between the links, as is the case for other prior techniques such as [1], one difficulty stems from the absence of a clear relationship between the common outage probability (representative of the average common BLER) and the individual outage probabilities (representative of the average individual BLER). This difficulty makes it impossible to demonstrate that this slow link adaptation method gives the best spectral efficiency. In addition, the "Genie Aided" scenario is not accurate enough and often requires corrections.

SUMMARY

One subject of the present invention is a method for transmitting successive messages forming a frame for a telecommunications system with M sources, possibly L relays and a destination, M≥2, L≥0 according to an orthogonal multiple access scheme of the transmission channel between the nodes taken from among the M sources and the L relays with a maximum number of $M+T_{max}$ time slots per transmitted frame including M slots allocated, during a first phase, to the successive transmission of the M sources, and $T_{max}$ slots for one or more cooperative transmissions allocated, during a second phase, to one or more nodes selected according to a selection strategy. The method comprises:

an initial link adaptation phase with determination, by the destination, of an initial rate for each source on the basis of the destination's knowledge of an average quality of each of the links in the system and with transmission of information about this initial rate by the destination to each source, for each frame from among a plurality of frames, successive transmissions of messages from the M sources during the M slots of the first phase with, respectively, modulation and coding schemes determined from the information about the initial rates.

The method is such that the link adaptation implemented by the destination is of slow type and consists in maximizing an average utility metric under the constraint of an average individual BLER for each source, the utility metric being an average spectral efficiency conditional upon the node selection strategy used during the second phase.

The OMAMRC transmission system under consideration comprises at least two sources, each of these sources being able to operate at different times either as a source or as a relay node. The system may possibly also comprise relays. Node terminology covers both a relay and a source acting as a relay node.

The links between the various nodes of the system are subject to slow fading and to white Gaussian noise. Knowledge of all of the links in the system (CSI: Channel State Information) by the destination is not available. Specifically, the links between the sources, between the relays, between the relays and the sources is not able to be observed directly by the destination, and would require an excessive exchange of information between the sources, the relays and the destination. In order to limit the cost of the feedback overhead, only information about the distribution/statistics of the channels (CDI: Channel Distribution Information) of all of the links, for example average quality (for example average SNR, average SNIR) of all of the links, is assumed to be known by the destination for the purpose of determining the rates allocated to the sources.

The mutually independent sources, during the first phase, broadcast their coded information sequences in the form of messages for the attention of a single recipient. Each source broadcasts its messages with an initial rate. The destination communicates, to each source, its initial rate through very low-rate control channels. The destination determines the initial rates from its knowledge of the statistics of all of the links.

Sources other than the transmitting source and possibly the relays, of "Half Duplex" type, receive the successive messages from the sources, decode them and, if they are selected, generate a message only from the messages from the sources that are decoded without an error.

The selected nodes then access the channel orthogonally in time with one another during the second phase in order to transmit their generated message to the destination.

The destination may choose which node should transmit at a given time. It is also possible for the relay nodes to follow an activation sequence known in advance by the destination and the relays. In the first case, the destination always chooses a node (source or relay) that was able to decode at least one message from a source without an error.

If necessary, the destination communicates its node selection strategy to the sources and to the relays via low-rate control channels.

The method is such that the link adaptation is of slow type and, unlike certain known transmission techniques involving the implementation of an IR-HARQ cooperation strategy based on SDF relaying, the method takes place in the context of a system with rates that may be asymmetrical between the sources and implements a strategy for maximizing the average spectral efficiency within the system under consideration, constrained to comply with an individual quality of service (QoS) per source, that is to say an average individual BLER per source.

This system is such that the destination does not have knowledge of the instantaneous quality of the links between the sources, between the sources and the relays, and between the relays, but only of the instantaneous quality of the links between the sources and the destination and between the relays and the destination.

Thus, the cooperation strategy according to the invention is such that the sources and the relays cooperate so as to maximize the average spectral efficiency in a situation closer to reality, that is to say where there is no symmetry imposed between the rates.

The system under consideration is such that the sources may themselves be relays. A relay differs from a source since it has no message to transmit that is specific thereto, that is to say it retransmits only messages coming from other nodes.

The method distinguishes between three phases; an initial phase and a $1^{st}$ phase and a $2^{nd}$ phase for each frame to be transmitted.

In the initialization phase, the destination determines an initial rate for each source, taking into account the average quality (for example SNR) of each of the links in the system.

The destination estimates the quality (for example SNR) of the direct links source to destination and relay to destination using known techniques based on the use of reference signals. The quality of the source-source, relay-relay and source-relay links is estimated by the sources and the relays using for example these same reference signals. The sources and the relays transmit the average qualities of the links to the destination. This transmission takes place before the initialization phase. Since only the average value of the quality of a link is taken into account, it is refreshed on a long time scale, that is to say over a time that makes it possible to average fast variations (fast fading) of the channel. This time is of the order of the time necessary to travel several tens of wavelengths of the frequency of the transmitted signal for a given speed. The initialization phase takes place for example every 200 to 1000 frames. The destination feeds back the initial rates that it has determined to the sources via a feedback path. The initial rates remain constant between two instances of the initialization phase.

In the first phase, the M sources successively transmit their message during the M time slots using, respectively, modulation and coding schemes that are determined from the initial rates.

In the $2^{nd}$ phase, the messages from the sources are transmitted cooperatively by the relays and/or by the sources. This phase lasts for at most $T_{max}$ time slots.

The utility metric, which consists of a spectral efficiency, is conditional upon the node selection strategy that is used during the second phase.

According to one embodiment, the method furthermore comprises a step of iterative calculation of the initial rates by the destination.

The "Genie Aided" approach, which consists in independently determining each rate of a source assuming that all of the messages from other sources are known to the destination and the relays, leads to initial rate values for each source that are not accurate enough. The iterative calculation makes it possible to correct these initial values by taking into account the selection strategy that is used during the second phase, which is not able to be achieved using the "Genie Aided" approach alone.

According to one embodiment, the cooperative transmission from a node in the second phase results in the transmission of redundancy based on incremental coding at the sources.

According to one embodiment, the node selection strategy used during the second phase follows a sequence known in advance by all of the nodes.

According to one embodiment, the step of iteratively calculating the initial rates takes into account a node selection strategy (strategy with random selection, strategy with cyclic selection, etc.).

According to one embodiment, the node selection strategy used during the second phase takes into account information coming from the nodes and indicating their set of correctly decoded sources.

According to one embodiment, the node selection strategy used during the second phase corresponds, at each time slot, to the selection of the node that has correctly decoded at least one source that the destination has not correctly decoded at the end of the previous time slot and that has the best instantaneous quality from among the instantaneous qualities of all of the links between the nodes and the destination.

According to one embodiment of the invention, the method for transmitting messages results from a software application that is divided into a plurality of specific software applications stored in the sources, in the destination and possibly in the relays. The destination may for example be the receiver of a base station. The execution of these specific software applications is suitable for implementing the transmission method.

Another subject of the invention is a system comprising M sources, possibly L relays, and a destination, M>1, L≥0, for implementing a transmission method according to a preceding subject.

Another subject of the invention is each of the specific software applications on one or more information media, said applications containing program instructions suitable for implementing the transmission method when these applications are executed by processors.

Another subject of the invention is configured memories containing instruction codes corresponding respectively to each of the specific applications.

The memory may be incorporated into any entity or device capable of storing the program. The memory may be of ROM type, for example a CD-ROM or a microelectronic circuit ROM, or else of magnetic type, for example a USB key or a hard disk.

On the other hand, each specific application according to the invention may be downloaded from a server accessible on an Internet network.

The optional features presented above in the context of the transmission method may possibly apply to the software application and to the memory that are mentioned above.

BRIEF DESCRIPTION OF THE DRAWINGS

Other features and advantages of the invention will become more clearly apparent upon reading the following description of embodiments, given by way of simple illustrative and non-limiting examples, and the appended drawings, in which.

DETAILED DESCRIPTION OF ILLUSTRATIVE EMBODIMENTS

Channel use is the smallest granularity in terms of time-frequency resources defined by the system that allows transmission of a modulated symbol. The number of channel uses is linked to the available frequency band and to the transmission duration.

In the "slow fading" case favored in the description, the fading gains are constant during the $M+T_{max}$ time slots, where $M+T_{max}$ is the maximum number of time slots to complete a transmission cycle.

Figure 1:
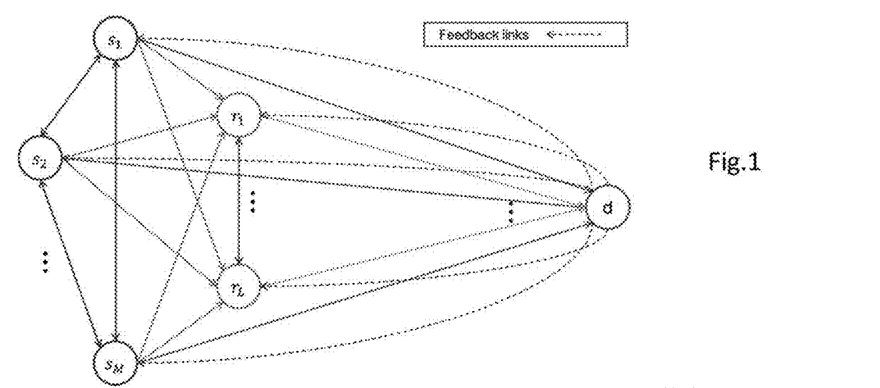
FIG. 1 is a diagram of an example of what is called a cooperative OMAMRC (Orthogonal Multiple Access Multiple Relays Channel) system according to the invention.
Figure 2:
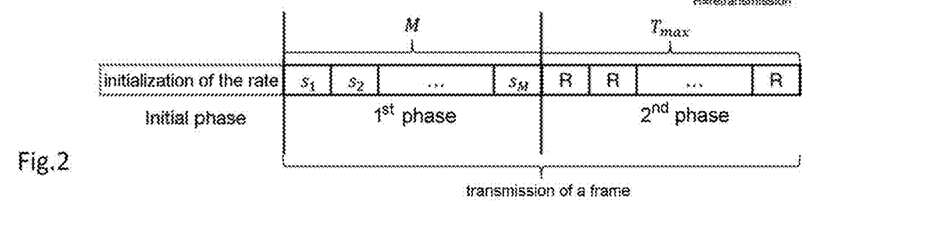
FIG. 2 is a diagram of a transmission cycle of a frame, which may be preceded by an initialization step according to the invention.

One embodiment of the invention is described in the context of an OMAMRC system illustrated in FIG. 1 and referring to the diagram of FIG. 2, which illustrates a transmission cycle of a frame.

This system comprises M sources that belong to the set of sources $\mathcal{S} = \{s_1, \ldots, s_M\}$, L relays that belong to the set of relays $\mathcal{R} = \{r_1, \ldots, r_L\}$ and a destination d. Each source of the set $\mathcal{S}$ communicates with the single destination using the other sources (user cooperation) and cooperating relays.

For the sake of simplifying the description, the following assumptions are made hereinafter on the OMAMRC system:

- the sources and the relays are equipped with a single transmission antenna;
- the sources, the relays and the destination are equipped with a single reception antenna;
- the sources, the relays and the destination are perfectly synchronized;
- the sources are statistically independent (there is no correlation between them);
- all of the nodes transmit with one and the same power;
- use is made of a CRC code assumed to be included in the $K_s$ bits of information from each source s in order to determine whether or not a message is correctly decoded;
- the links between the various nodes suffer from additive noise and fading. The fading gains are fixed during the transmission of a frame carried out for a maximum duration of $M+T_{max}$ time slots, but may change independently from one frame to another. $T_{max} \geq 2$ is a parameter of the system;
- the instantaneous quality of the channel/direct link at reception (CSIR Channel State Information at Receiver) is available at the destination, at the sources and at the relays;
- the feedback is error-free (no error on the control signals);
- the duration of the time slots is variable.

The nodes comprise the relays and the sources, which may behave like a relay when they are not transmitting their own message.

The nodes, M sources and L relays, access the transmission channel according to an orthogonal multiple access scheme that allows them to listen to the transmissions from the other nodes without interference. The nodes operate in a half-duplex mode.

The following notations are used:

$x_{a,k} \in \mathbb{C}$ is the coded modulated symbol for the use of the channel k transmitted by the node $a \in \mathcal{S} \cup \mathfrak{R}$, $y_{a,b,k}$ is the signal received at the node $b \in \mathcal{S} \cup \mathfrak{R} \cup \{d\} \setminus \{a\}$ corresponding to a signal transmitted by the node $a \in \mathcal{S} \cup \mathfrak{R}$, $\gamma_{a,b}$ is the average signal-to-noise ratio (SNR), which takes into account the effects of channel attenuation (path-loss) and of masking (shadowing), $h_{a,b}$ is the channel attenuation gain (fading), which follows a complex circular-symmetry Gaussian distribution with an average of zero and a variance of $\gamma_{a,b}$, and the gains are independent of one another, $n_{a,b,k}$ are samples of a white Gaussian noise (AWGN) distributed identically and independently and that follow a complex circular-symmetry Gaussian distribution with an average of zero and unitary variance.

The signal received at the node $b \in \mathcal{S} \cup \mathfrak{R} \cup \{d\} \setminus \{a\}$ corresponding to the signal transmitted by the node $a \in \mathcal{S} \cup \mathfrak{R}$ may be written:

$$y_{a,b,k} = h_{a,b} x_{a,k} + n_{a,b,k} \qquad (1)$$

During the first phase of M time slots, each source transmits its code words during $N_1$ channel uses, $k \in \{1, \ldots, N_1\}$. During the second phase of $T_{max}$ time slots, each selected node transmits information representative of the messages from the sources decoded without an error by this node during $N_2$ channel uses, $k \in \{1, \ldots, N_2\}$.

By using reference signals (pilot symbols, SRS signals from 3GPP LTE, etc.), the destination is able to determine the gains (CSI Channel State Information) of the direct links $h_{dir} = \{h_{s_1,d}, \ldots, h_{s_M,d}, h_{r_1,d}, \ldots, h_{r_L,d}\}$, that is to say of the source to destination and relay to destination links, and is therefore able to deduce the average SNRs of these links therefrom.

On the other hand, the gains of the links between sources, of the links between relays and of the links between sources and relays are not known to the destination. Only the sources and the relays are able to estimate a metric of these links by using reference signals in a manner similar to that used for the direct links Given that the channel statistics are assumed to be constant between two initialization phases, the transmission of the metrics to the destination by the sources and the relays is able to be performed only at the same frequency as the initialization phase. The channel statistics for each link are assumed to follow a centered circular complex Gaussian distribution and the statistics are independent between the links. It is therefore enough to consider only the average SNR as a measure of the statistics of a link.

The sources and the relays therefore feed back metrics representative of the average SNRs of the links that they are able to observe to the destination.

The destination thus knows the average SNR of each of the links.

During an initial link adaptation phase that precedes the transmission of a plurality of frames, the destination feeds back a value (index, MCS, rate, etc.) representative of an initial rate for each source. Each of the initial rates unambiguously determines an initial modulation and coding scheme (MCS) or, vice versa, each initial MCS determines an initial rate.

These initial rates are determined by the destination so as to maximize an average spectral efficiency conditional upon the node selection strategy used during the second phase and under the constraint of an average individual BLER for each source. The initial rates are fed back via very low-rate control channels. The maximization is typically performed under the constraint of the average SNRs of the links in the system.

Each source transmits its framed data to the destination using the other sources and the relays.

A frame occupies time slots during the transmission of the M messages from the respectively M sources. The transmission of a frame (which defines a transmission cycle) takes place during $M+T_{max}$ time slots: M slots for the $1^{st}$ phase, $T_{max}$ slots for the $2^{nd}$ phase.

During the first phase, each source $s \in \mathcal{S} = \{s_1, \ldots, s_M\}$ transmits, after coding, a message $u_s$ containing $K_s$ bits of information $u_s \in \mathbb{F}_2^{K_s}$, $\mathbb{F}_2$ being the two-element Galois body. The message $u_s$ comprises a code of CRC type that makes it possible to verify the integrity of the message $u_s$. The message $u_s$ is coded according to the initial MCS. Given that the initial MCSs may be different between the sources, the lengths of the coded messages may be different between the sources. The coding uses an incremental redundancy code. The code word that is obtained is divided into redundancy blocks. The incremental redundancy code may be systematic, and the bits of information are then included in the first block. Whether the incremental redundancy code is systematic or not, it is such that the first block is able to be decoded independently of the other blocks. The incremental redundancy code may be created for example by way of a finite family of punctured linear codes with compatible rates or of codes with no rate that are modified so as to operate with finite lengths: raptor code (RC), rate compatible punctured turbo code (RCPTC), rate compatible punctured convolutional code (RCPCC), rate compatible low density parity check code LDPC (RCLDPC).

In the first phase, the M sources successively transmit their message during the M slots with, respectively, modulation and coding schemes determined from the initial rates. Each time slot comprises $N_1$ channel uses such that the time resource is shared equally between the sources.

With each transmitted message corresponding to a source $s_1, \ldots, s_M$, a correctly decoded message is assimilated to the corresponding source for the purposes of notation.

When a source transmits, the other sources and the relays listen and try to decode the messages received at the end of each time slot. The success of the decoding is decided using the CRC.

In the second phase, the selected node, source or relay, acts as a relay by cooperating with the sources in order to help the destination to correctly decode the messages from all of the sources. The selected node transmits, that is to say it cooperates by transmitting the words or some of the words that it has correctly decoded. The second phase comprises at most $T_{max}$ time slots, called rounds. Each round $t \in \{1, \ldots, T_{max}\}$ has a duration of $N_2$ channel uses.

During this phase, the destination follows a certain strategy in order to decide which node transmits at each time slot (round). The destination informs the nodes by using a low-rate control channel (limited feedback) in order to transmit a feedback message. This feedback message is based on its result of decoding the received frames. The destination thus supervises the transmission of the nodes by using these feedback messages, thereby making it possible to improve spectral efficiency and reliability by increasing the probability of the destination decoding all of the sources.

If the decoding of all of the sources is correct, the feedback is a message of type ACK. In this case, a transmission cycle of a new frame begins with the erasure of the memories of the relays and of the destination and with the transmission of new messages by the sources.

If the decoding of at least one source is incorrect, the feedback message is typically a NACK. Each node $a \in \mathcal{S} \cup \mathcal{R}$ transmits its set of correctly decoded sources at the end of the previous time slot (round) denoted $\mathcal{S}_{a,t-1}$. By convention, $\mathcal{S}_{b,t} \subseteq \mathcal{S}$ denotes the set of messages (or sources) correctly decoded by the node $b \in \mathcal{S} \cup \mathcal{R} \cup \{d\}$ at the end of the time slot t (round t), $t \in \{0, \ldots, T_{max}\}$. The end of the time slot (round) t=0 corresponds to the end of the first phase. The number of time slots used during the second phase $t_{used} = \{1, \ldots, T_{max}\}$ depends on the success of decoding at the destination.

The selected node transmits parities determined from the messages in its set of correctly decoded sources using joint network coding and channel coding (Joint Network Channel Coding). This transmission takes place during a time slot of $N_2$ channel uses. The other nodes and the destination may improve their own decoding by using the transmission of the selected node and update their set of correctly decoded sources accordingly.

The initial transmission rate of a source s is $R_s = K_s/N_1$ in bits per complex dimension (b.c.u). The long-term rate $\overline{R}_s$ of a source is defined as the number of bits transmitted compared to the total number of channel uses for a number of frames transmitted, which tends towards infinity:

$$\overline{R}_s = \frac{R_s}{M + \alpha \mathbb{E}(T)} \quad (2)$$

where $\mathbb{E}(T) = \sum_{t=1}^{T_{max}} t \Pr\{T=t\}$ is the average number of retransmission time slots (rounds) used during the second phase, and where $\alpha = N_2/N_1$.

Spectral efficiency may be defined as the sum of individual spectral efficiencies:

$$\eta = \sum_{i=1}^{M} \overline{R}_{s_i}(1 - \Pr\{\mathcal{O}_{s_i, T_{max}}\}) \quad (3)$$

where $\mathcal{O}_{s, T_{max}}$ is the event that the source s is not correctly decoded by the destination at the end of the time slot (round) $T_{max}$, hereinafter called individual outage event of the source s at the end of the time slot (round) $T_{max}$.

In general, the individual outage event of the source s at the end of the time slot (round) t, $\mathcal{O}_{s,t}(a_t, \mathcal{S}_{a_t,t-1} | h_{dir}, \mathcal{P}_{t-1})$ depends on the selected node $a_t \in \mathcal{N} = \mathcal{S} \cup \mathcal{R}$ and on the associated set of decoded sources $\mathcal{S}_{a_t,t-1}$. This is the case conditionally on the knowledge of the gains of the direct channels $h_{dir}$ and of $\mathcal{P}_{t-1}$. $\mathcal{P}_{t-1}$ is the set comprising all of the nodes $\hat{a}_l$ that were selected at the time slots (rounds) $l \in \{1, \ldots t-1\}$ preceding the time slot (round) t and their associated decoding set $\mathcal{S}_{\hat{a}_l, l-1}$ and the decoding set of the destination $\mathcal{S}_{d,t-1}$.

The common outage event at the end of the time slot (round) t, $\mathcal{E}_t(a_t, \mathcal{S}_{a_t,t-1} | h_{dir}, \mathcal{P}_{t-1})$, is defined as being the event that at least one source is not correctly decoded by the destination at the end of the time slot (round) t.

The probability of the individual outage event of the source s at the end of the time slot (round) t for a candidate node $a_t$ may be expressed in the form: $\mathbb{E}(\mathbf{1}_{\{\mathcal{O}_{s,t}(a_t, \mathcal{S}_{a_t,t-1} | h_{dir}, \mathcal{P}_{t-1})\}})$ where $\mathbb{E}(\cdot)$ is the expectation operator and such that $\mathbf{1}_{\{\mathcal{V}\}}$ takes the value 1 if the event $\mathcal{V}$ is true and the value 0 if not.

The probability of the common outage event may be defined in the same way. Hereinafter, the dependency on the knowledge of $h_{dir}$ and of $\mathcal{P}_{t-1}$ is omitted for the sake of simplifying the notations.

The common outage event of a set of sources occurs when the vector of their rate is outside the corresponding MAC capacity region.

For some subsets of sources $\mathcal{B} \subseteq \bar{\mathcal{S}}_{d,t-1}$ where $\bar{\mathcal{S}}_{d,t-1} = \mathcal{S} \setminus \mathcal{S}_{d,t-1}$ is the set of sources that are not correctly decoded by the destination at the end of the time slot (round) t−1, the common outage event may be expressed in the form:

$$\mathcal{E}_{t,\mathcal{B}}(a_t, \mathcal{S}_{a_t,t-1}) = \cup_{\mathcal{U} \subseteq \mathcal{B}} \mathcal{F}_{d,\mathcal{B}}(\mathcal{U}) \quad (4)$$

such that the sources that belong to $\mathcal{I} = \bar{\mathcal{S}}_{d,t-1} \setminus \mathcal{B}$ are considered to be interference.

$\mathcal{F}_{d,\mathcal{B}}(\mathcal{U})$ reflects non-compliance with the MAC inequality associated with the sum rate of the sources contained in $\mathcal{U}$:

$$\mathcal{F}_{d,\mathcal{B}}(\mathcal{U}) = \{\sum_{s \in \mathcal{U}} R_s > \sum_{s \in \mathcal{U}} I_{s,d} + \sum_{l=1}^{t-1} \alpha I_{\hat{a}_l, d} \mathbf{1}_{\{\mathcal{C}_{\hat{a}_l,s}\}} + \alpha I_{a_t,d} \mathbf{1}_{\{\mathcal{C}_{a_t,s}\}}\} \quad (5)$$

where $$\mathcal{C}_{\hat{a}_l,s} = \{\{s \in \mathcal{S}_{\hat{a}_l, l-1} \cap \mathcal{U}\} \wedge \{\mathcal{S}_{\hat{a}_l, l-1} \cap \mathcal{I} = \varnothing\}\}, \mathcal{C}_{a_t,s} = \{\{s \in \mathcal{S}_{a_t, t-1} \cap \mathcal{U}\} \wedge \{\mathcal{S}_{a_t, t-1} \cap \mathcal{I} = \varnothing\}\}$$

where $\wedge$ which represents the logical operator, $I_{a,b}$ denotes the mutual information between the nodes a and b, $\hat{a}_l$, l=1àt−1 denotes an already selected node.

The factor $\alpha$ makes it possible to normalize, before addition, the two terms associated respectively with the two phases for which the time slots have respective durations of $N_1$ and $N_2$ channel uses.

The individual outage event of the source s at the end of the time slot (round) t may be written:

$$\mathcal{O}_{s,t}(a_t, \mathcal{S}_{a_t,t-1}) = \cap_{\mathcal{J} \subset \mathcal{S}_{d,t-1}} \cup_{u \subset \mathcal{J}, s \in u} \{\Sigma_{s \in u} R_s > \Sigma_{s \in u} I_{s,d} + \Sigma_{l=1}^{t-1} \alpha I_{\hat{a}_l,d} 1_{\{c_{\hat{a}_l,s}\}} + \alpha I_{a_l,d} 1_{\{c_{a_l,s}\}}\} \quad (6)$$

where $\bar{\mathcal{J}} = \bar{\mathcal{S}}_{d,t-1} \backslash \mathcal{J}$ and $\mathcal{C}_{\hat{a}_l,s}$ and $\mathcal{C}_{a_l,s}$ have the same expression as for (5).

The destination implements, according to the invention, a slow link adaptation. This adaptation consists in maximizing an average utility metric after a number $X \leq T_{max}$ of retransmissions (cooperative transmissions) taking place during the second phase under the constraint of an average individual BLER for each source. The utility metric is an average spectral efficiency conditional upon the node selection strategy used during this second phase.

According to a first class of strategies, the selection of the nodes taken from among the sources and the relays depends on the sets of sources correctly decoded by the nodes. One example under consideration, called preferred strategy, is based on an IR-HARQ type selection that aims to maximize spectral efficiency. According to this preferred strategy, at the time slot (round) t of the second phase, the destination chooses the node with the best instantaneous quality of the link between itself and this node (for example the greatest mutual information between itself and this node) taken from among all of the nodes that were able to correctly decode at least one source of the set $\bar{\mathcal{S}}_{d,t-1}$, these nodes being said to be eligible. This strategy makes it possible to achieve a good compromise between computation complexity and performance, but at the expense of a large number of control signals.

According to a second class of strategies, the selection of the nodes taken from among the sources and the relays does not depend on the sets of the sources correctly decoded by the nodes. According to this class, the selection is determined and known to all the nodes. One example under consideration is such that the selection sequence is cyclical and such that the selected node is selected only from among the relays. According to this example, each relay benefits from at least one dedicated time slot (round) during the second phase to transmit. In order not to favor one relay over another, the sequence changes with each frame. According to this example, only one feedback bit from the destination is enough to feed back a common ACK/NACK message.

In the first phase, each source s transmits with the initial rate $R_s$.

Let $BLER_{s,X}(R_s)$ be the average probability of having the message from the source s not correctly decoded after X time slots (rounds) of the second phase.

In a point-to-point transmission, the individual throughput of the source is given by:

$$R_s(1-BLER_{s,X}(R_s))$$

And to optimize this throughput, the usual method consists in finding the optimum pair $(R_s, BLER_{s,X}(R_s))$.

Such a usual method is not able to be used for a system with M sources, possibly L relays, and a destination with an orthogonal multiple access scheme of the transmission channel, since the $BLER_{s,X}$ is dependent on all of the rates $(R_1, \ldots, R_M)$. This is because the decoding set of the node selected at the current time slot (round) depends on all of the rates, and these influence the probability of incorrect decoding of the message from the source s.

In order not to overload the notations, $R_{s_i}$ is used to distinguish the rate of the source $s_i$ after optimization from $R_i$, which is a possible value of $R_{s_i}$ from the whole set of possible rates $\{\bar{R}_1, \ldots, \bar{R}_{n_{MCS}}\}$. $n_{MCS}$ is the number of different MCSs. The method according to the invention is a solution to the following optimization problem:

$$(R_{s_1}, \ldots, R_{s_M}) = \underset{(R_1, \ldots, R_M) \in \{\bar{R}_1, \ldots, \bar{R}_{n_{MCS}}\}^M}{\operatorname{argmax}} \sum_{i=1}^{M} \frac{R_i}{M + \alpha \mathbb{E}(X_{used})} (1 - Pr\{\mathcal{O}_{s_i, X}\}) \quad (7)$$

under the constraint that $Pr\{\mathcal{O}_{s,X}\} \leq QoS_s$, $\forall s \in \mathcal{S}$.

In relationship (7), $X_{used}$ is a random variable that represents the number of time slots (rounds) used during the second phase $X_{used} \leq X$. The distribution of $X_{used}$ depends on $(R_1, \ldots, R_M)$ and on $Pr\{\mathcal{O}_{s,X}\}$, thereby making optimization (7) multidimensional of cardinality $n_{MCS}^M$, that is to say 3375 possible M-tuples $(R_1, \ldots, R_M)$ for a family of fifteen MCSs and three sources. An exhaustive search very quickly becomes impossible when the number of sources increases.

What is called the "Genie Aided" approach consists in assuming, in the initialization step, that all of the sources s except for the source $s_i$ whose rate it is desired to initialize are considered to be correctly decoded, $s \in \mathcal{S} \backslash s_i = \{s_1, s_2, \ldots, s_{i-1}, s_{i+1}, \ldots, s_M\}$. All of the sources $\{s_1, s_2, \ldots, s_{i-1}, s_{i+1}, \ldots, s_M\}$ other than $s_i$ act as relays, denoted $\{r_{L+1}, \ldots, r_{L+M-1}\}$. For the source $s_i$ under consideration, the network is a multiple relay network denoted (1, L+M−1,1) and no longer a multiple relay and multiple user network. The corresponding system is illustrated by the diagram in FIG. 3 when $s_i = s_1$.

Figure 3:
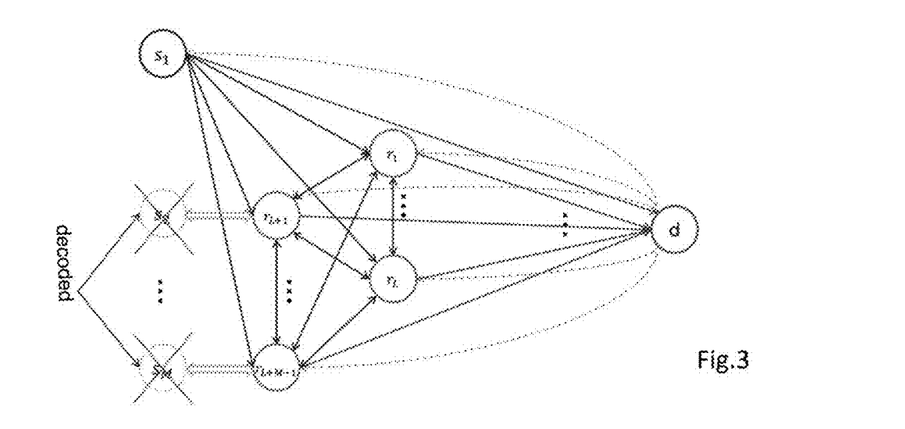
FIG. 3 is a diagram of the OMAMRC system of FIG. 1 for which all of the sources except for the source $s_1$ are considered to be correctly decoded.

According to the invention, this approach is supplemented by taking into account the quality of all of the links that are able to assist the transmission of the source $s_i$. This method gives a more precise solution in particular in the case of a priori knowledge of the node selection sequence used in the second step.

Given the simplification of the network (1, L+M−1,1), finding the maximum rate $R_{s_i}$ for the source $s_i$ under the "Genie Aided" scenario may be written in the form:

$$R_{s_i} = \underset{R_i \in \{\bar{R}_1, \ldots, \bar{R}_{n_{MCS}}\}}{\operatorname{argmax}} \left\{ \frac{R_i}{M + \alpha \mathbb{E}(X_{used, R_i})} \left(1 - \int \left[R_i > I_{s_i,d} + \sum_{l=1}^{X} \alpha I_{\hat{a}_l,d} 1_{\{s_i \in S_{\hat{a}_l,l-1}\}}\right] P(H) dH\right)\right\} \quad (8)$$

such that $Pr\{\mathcal{O}_{s_i,X}\} \leq QoS_{s_i}$

It is clearly apparent from equation (8) that the rate $R_{s_i}$ under the "Genie Aided" scenario depends on the selected node $\hat{a}_l$ at the time slot (round) l. In order to determine an upper bound on the rate $R_{s_i}$ under the "Genie Aided" scenario for the source $s_i$, it is enough to choose the optimum node selection strategy under the "Genie Aided" scenario for this same source $s_i$. This is described by algorithm 3 in appendix A.

Furthermore, calculation of optimization (8) is given by algorithm 1 in appendix A. Each rate value of the set of possible rates $\{\bar{R}_1, \ldots, \bar{R}_{n_{MCS}}\}$ is considered one after the other in a first loop on j. $n_{MCS}$ is the number of modulation and coding schemes. A second loop on cnt makes it possible to average the individual BLER or $Pr\{\mathcal{O}_{s,X}\}$ on Nb_MC channel draws according to the statistics given by the average SNRs of all of the links Inside the loop cnt, all of the channels are thus known resulting from a random draw. It is thereafter enough to calculate equation (8) using a Monte-Carlo approach where the integral is replaced by a sum:

$$\int \left[ R_i > I_{s_i,d} + \sum_{l=1}^{X} \alpha I_{\hat{a}_l,d} 1_{\{s_i \in S_{\hat{a}_l,l-1}\}} \right] P(H) dH =$$

$$\frac{1}{Nb\_MC} \sum_{cnt=1}^{Nb\_MC} \left[ R_i > I_{s_i,d}(H_{cnt}) + \sum_{l=1}^{X} \alpha I_{\hat{a}_l,d}(H_{cnt}) 1_{\{s_i \in S_{\hat{a}_l,l-1}\}} \right]$$

and where the variable out corresponds to:

$$out = \sum_{cnt=1}^{Nb\_MC} \left[ R_i > I_{s_i,d}(H_{cnt}) + \sum_{l=1}^{X} \alpha I_{\hat{a}_l,d}(H_{cnt}) 1_{\{s_i \in S_{\hat{a}_l,l-1}\}} \right]$$

In order to determine an average approximation of the rate that the source $s_i$ is able to use under the "Genie Aided" scenario, a strategy of random selection of the node $\hat{a}_l$ (from among all of the relay nodes and for each time slot (round) l) is adopted. This is undertaken during step 11 of algorithm 1 in Appendix A and consists in randomly selecting the node $\hat{a}_x$ from among all of the possible relay nodes.

In order to determine the best initial rates that all of the sources are able to use, one embodiment of the method according to the invention according to which the determination of the initial rates by the destination comprises an iterative calculation step may follow the sequence given in Appendix A, algorithm 2. This algorithm takes the initial rates under the "Genie Aided" scenario and a particular selection strategy (for example random selection) as starting point. The upper bound is based on the selection strategy given by algorithm 3, which may be used to minimize the number of calculations (no rate higher than that given by the "Genie Aided" upper bound for a source s should be tested for this same source) or even as a starting point for algorithm 2.

According to algorithm 2, all of the source rates are updated cyclically. The rate of a source $s_i$ depends on the rates of the sources having an index i' less than i, i'<i, updated in the same iteration and rates updated for the last time in the previous iteration for the sources having an index i" greater than i, i">i. The update, at each iteration t of the rate of a source $s_i$, i∈{1, . . . , M}, consists in verifying, from the rate calculated in the previous iteration, $R_{s_i}(t-1)$, whether the spectral efficiency increases or decreases by increasing the value of the rate $R_{s_i}(t)$ to the slightly higher value (the rate values being quantified).

If the spectral efficiency increases, then the increase in the rate value is continued until the spectral efficiency decreases. The selected rate value $R_{s_i}(t)$ is the one just before the spectral efficiency decreases.

If the spectral efficiency decreases when the rate $R_{s_i}(t)$ is increased for the first time, then the value of the rate is decreased until the spectral efficiency decreases. The selected rate value $R_{s_i}(t)$ is the one just before the spectral efficiency decreases.

Any decrease or increase in the rate is bounded by the upper bound as determined by algorithm 3.

REFERENCES

[1] A. Mohamad, R. Visoz and A. O. Berthet, "Cooperative Incremental Redundancy Hybrid Automatic Repeat Request Strategies for Multi-Source Multi-Relay Wireless Networks," *IEEE Commun. Lett.*, vol. 20, no. 9, pp. 1808-1811, September 2016.

APPENDIX A

| Alg. 1 - Monte-Carlo simulation to determine rates under the "Genie Aided" scenario: |
|---|
| 1. $1^{st}$ loop: sequentially select the possible candidate rate $R_j$ that has not yet been considered in the set $\{\overline{R}_1, \ldots, \overline{R}_{n_{MCS}}\}$. If all of the rates have been considered, go to end $1^{st}$ loop. |
| 2. Initialize the counter out of the Monte-Carlo implementations (of channel matrix H) that lead to an outage: out = 0, the counter $\overline{X}_{used}$ of the number of cumulative time slots (rounds) used during the second phase: $\overline{X}_{used} = 0$, the set $S_{d,0} = S \backslash s_i$ according to the "Genie Aided" scenario. |
| 3.     $2^{nd}$ loop: sequentially select the counter cnt of the current implementation of a Monte-Carlo simulation: 1 ≤ cnt ≤ Nb_MC where Nb_MC is the maximum number of Monte-Carlo implementations, for example Nb_MC = 1000. If the counter has reached the maximum number cnt > Nb_MC, go to end $2^{nd}$ loop. |
| 4.         determine $H_{cnt}$ based on P(H) the joint probability of implementing the channels of all of the links $h_{a,b}$. |
| 5.         calculate $I_{a,b}(H_{cnt})$ for all of the links |
| 6.         if $R_j \leq I_{s_i,d}$ then |
| 7.             $S_{d,0} = S_{d,0} \cup \{s_i\}$, |
| 8.             continue, (no change in the values of counters out and $\overline{X}_{used}$). |
| 9.         end if |
| 10.         $3^{rd}$ loop: for each time slot (round), x = 1 à X |
| 11.             selection of the node $\hat{a}_x$ by the destination by applying a selection strategy (for example Alg. 3 for an upper bound or random selection) |
| 12.             calculate $C_2 = I_{s_i,d} + \Sigma_{k=1}^{x} \alpha I_{\hat{a}_k,d} 1_{\{s_i \in S_{\hat{a}_k,k-1}\}}$ |
| 13.             if $R_j \leq C_2$ then |
| 14.                 $X_{used} = x \cdot$ (the number of time slots (rounds) used in the current implementation of the Monte-Carlo simulation) |
| 15.                 break, (no change in the value of the counter out) |
| 16.             end if |
| 17.             if x = X then |
| 18.                 out = out + 1 |

APPENDIX A-continued

Alg. 1 - Monte-Carlo simulation to determine rates under the "Genie Aided" scenario:

19.     $X_{used} = X.$
20.     end if
21.   end of the $3^{rd}$ loop
22.     $\overline{X}_{used} = \overline{X}_{used} + X_{used}$
23.   end of the $2^{nd}$ loop
24. determine the average outage probability of the source $s_i$ for the rate $R_j$: $P^{out}_{s_i,R_j} = \dfrac{out}{Nb\_MC}$
25. determine the average number of time slots (rounds) used during the second phase:

$$\mathbb{E}(X_{used,R_j}) = \dfrac{\overline{X}_{used}}{Nb\_MC}$$

26. end of the $1^{st}$ loop
27. choose the maximum rate $R_{s_i}$ that the source $s_i$ is able to use:

$$R_{s_i} = \underset{R_j \in \{R_1,\ldots,R_{n_{MCS}}\}}{\mathrm{argmax}} \left\{ \dfrac{R_j}{M + \alpha \mathbb{E}(X_{used,R_j})} (1 - P^{out}_{s_i,R_j}) \right\}$$

such that $P^{out}_{s_i,R_j} \leq QoS_{s_i}$.

---

Alg.2-Iterative procedure for correcting "Genie Aided" rates:

1. initialization of the iteration counter: $t = 0$,
2. initialization of the rates of the sources using what is called a "Genie Aided" approach conditional upon a random selection of nodes,
3. as long as $(|R_{s_i}(t) - R_{s_i}(t-1)| > 0, \forall i \in \{1,\ldots,M\})$ do
4.   increment the iteration counter: $t = t + 1$
5.   for each source $s_i$, $i \in \{1,\ldots,M\}$ do
6.     considering the already determined rates of the sources:
$(R_{s_1}(t),\ldots,R_{s_{i-1}}(t), R_{s_{i+1}}(t-1),\ldots,R_{s_M}(t-1))$, update the rate value $R_{s_i}(t)$ of the source $s_i$ such that $BLER_{s_i} \leq QoS_{s_i}$. Rem1. The value of $R_{s_i}(t)$ is different from $R_{s_i}(t-1)$ if and only if $BLER_{s_i} \leq QoS_{s_i}$ and the average spectral efficiency has increased. Rem 2: the calculation of the average individual BLERs and the spectral efficiency follows a Monte-Carlo approach without a "Genie Aided" scenario.
7.   end for
8. end as long as

---

Alg. 3 - Optimal selection strategy under the "Genie Aided" scenario:

1. Loop: determine the decoding set of each candidate node $a_x \in \mathcal{S} \cup \mathfrak{R}$ at the end of the time slot (round) $x - 1$.
2. "Genie Aided" initialization: $\mathcal{S}_{a_x,x-1} = \mathcal{S} \backslash s_i$.
3.   calculate $C_1 = I_{s_i,a_x} + \sum_{k=1}^{x-1} \alpha I_{\hat{a}_k,a_x} \mathbf{1}_{\{s_i \in \mathcal{S}_{\hat{a}_k,k-1}\}}$
4.   if $R_j \leq C_1$ then
5.     $\mathcal{S}_{a_x,x-1} = \mathcal{S}_{a_x,x-1} \cup \{s_i\}$.
6.   end if
7. end of the loop
8. selection of the node $\hat{a}_x$ by the destination:

$$\hat{a}_x = \underset{a_x \in \mathcal{S} \cup \mathfrak{R}}{\mathrm{argmax}} \left\{ I_{a_x,d} \mathbf{1}_{\{s_i \in \mathcal{S}_{a_x,x-1}\}} \right\}$$

---

Although the present disclosure has been described with reference to one or more examples, workers skilled in the art will recognize that changes may be made in form and detail without departing from the scope of the disclosure and/or the appended claims.

The invention claimed is:

1. A transmission method for transmitting successive messages forming a frame for a telecommunications system with M sources, possibly L relays and a destination, $M \geq 2$, $L \geq 0$ according to an orthogonal multiple access scheme of a transmission channel between nodes taken from among the M sources and the L relays with a maximum number of $M + T_{max}$ time slots per transmitted frame including M slots allocated, during a first phase, to the successive transmission of the M sources, and $T_{used}$ slots for one or more cooperative transmissions allocated, during a second phase, to one or more nodes selected according to a selection strategy, $T_{used} \leq T_{max}$, wherein the method comprises:

performing, by the destination, an initial link adaptation phase including determining an initial rate for each source on the basis of the destination's knowledge of an average quality of each of the links in the system and with transmission of information about this initial rate by the destination to each source; and successively transmitting, by the M sources, for each frame from among a plurality of frames, messages during the M slots of the first phase with, respectively, modulation and coding schemes determined from the information about the initial rates, wherein the link adaptation implemented by the destination comprises maximizing an average utility metric under constraint of an average individual block error rate (BLER) for each source, the utility metric being an average spectral efficiency conditional upon the node selection strategy used in the second phase.

2. The transmission method as claimed in claim 1, wherein the method furthermore comprises iteratively calculating the initial rates by the destination.

3. The transmission method as claimed in claim 2, wherein the node selection strategy used during the second phase follows a sequence known in advance by all of the nodes.

4. The transmission method as claimed in claim 2, wherein the iteratively calculating the initial rates takes into account the node selection strategy.

5. The transmission method as claimed in claim 2, wherein the node selection strategy used during the second phase takes into account information coming from the nodes and indicating their set of correctly decoded sources.

6. The transmission method as claimed in claim 2, wherein the node selection strategy used during the second phase corresponds, at each slot, to the selection of the node from among the nodes that have correctly decoded at least one source that the destination has not correctly decoded at the end of the previous time slot, called eligible nodes, that has the best instantaneous quality from among the instantaneous qualities of all of the links between these eligible nodes and the destination.

7. A system comprising:
M sources, L relays and a destination, M≥2, L≥0, for transmitting successive messages forming a frame according to an orthogonal multiple access scheme of a transmission channel between nodes taken from among the M sources and the L relays with a maximum number of M+$T_{max}$ time slots per transmitted frame including M slots allocated, during a first phase, to the successive transmission of the M sources, and $T_{used}$ slots for one or more cooperative transmissions allocated, during a second phase, to one or more nodes selected according to a selection strategy, $T_{used} \leq T_{max}$, wherein:
the destination comprises a first processor and a first non-transitory computer-readable medium comprising instructions stored thereon which when executed by the first processor configure the destination to:
perform an initial link adaptation phase including determining an initial rate for each source on the basis of the destination's knowledge of an average quality of each of the links in the system and with transmission of information about this initial rate by the destination to each source,
wherein the link adaptation implemented by the destination comprises maximizing an average utility metric under constraint of an average individual block error rate (BLER) for each source, the utility metric being an average spectral efficiency conditional upon the node selection strategy used in the second phase; and
each of the M sources comprises a second processor and a second non-transitory computer-readable medium comprising instructions stored thereon which when executed by the second processor configure the M sources to:
for each frame from among a plurality of frames, successively transmit messages during the M slots of the first phase with, respectively, modulation and coding schemes determined from the information about the initial rates.

* * * * *